United States Patent [19]

Nishimura et al.

[11] Patent Number: 4,525,723

[45] Date of Patent: Jun. 25, 1985

[54] MAGNETIC RECORDING HEAD

[75] Inventors: Nobuo Nishimura; Teruhiko Itami; Toshifumi Kimoto; Shunsuke Tomiyama; Koichi Saitoh, all of Tokyo, Japan

[73] Assignee: Xerox Corporation, Stamford, Conn.

[21] Appl. No.: 449,940

[22] Filed: Dec. 15, 1982

[30] Foreign Application Priority Data

Dec. 25, 1981 [JP] Japan ................................. 56-209114

[51] Int. Cl.³ ............................................ G01D 15/12
[52] U.S. Cl. .................................... 346/74.4; 346/74.5
[58] Field of Search ................ 346/74.4, 74.5; 360/59, 360/125, 126

[56]  References Cited
U.S. PATENT DOCUMENTS 4,442,441  4/1984  Kikuchi et al. ..................... 346/74.4

Primary Examiner—Thomas H. Tarcza
Attorney, Agent, or Firm—Robert A. Chittum

[57] ABSTRACT

A thin film magnetic recording head and process for fabricating it is disclosed. The magnetic recording head has a core with a gap the same length as the width of an original document to be produced and is positioned in contact with a moving magnetic recording medium and perpendicular to the direction of movement thereof. A high magnetic permeable body is disposed in the gap of the head core and is in contact with the magnetic recording medium. A heat generation body of the same length as the high magnetic permeable body is positioned in contact therewith. Means for selectively heating segments of the heat generation body corresponding to the width of a picture element is provided. The portions of segments the high magnetic permeable body that are heated via the heat generation body segments, above its curie point are rendered non-magnetic forcing the magnetic flux generated in the core by an exciting coil external of this portion and into the magnetic recording medium, thus forming latent magnetic images in the recording medium.

4 Claims, 9 Drawing Figures

MAGNETIC RECORDING HEAD

This invention relates to a magnetic recording head for recording latent magnetic images on a recording medium and, more specifically to a thin film magnetic recording head and method of fabricating it.

Known processes for forming latent magnetic images in magnetography include, for example, applying a.c. current modulated with video signals to a magnetic head in close contact with a magnetic recording medium, thereby obtaining latent magnetic images on the recording mechanism in accordance with the a.c. current. In order to produce appropriate recording speed, it is presently necessary to provide a plurality of magnetic heads arranged side-by-side for the width of the magnetic recording medium and resulting hard copy document therefrom. Manufacture of such an array of recording heads to provide full width recording requires highly skilled, complex fabrication techniques to meet the required design tolerances. It is, therefore, expensive to produce, making commercialization of full width magnetic recording devices generally impractical. Also known in the art is a method of applying d.c current modulated with video signals to a heat generation body in contact with a magnetic recording medium having a relatively low magnetic curie point, thereby obtaining latent magnetic images on the recording medium in accordance with the d.c. current, when an a.c. magnetic field is applied to that part of the magnetic recording medium that is heated to a temperature above the curie point.

The heat generation body of the latter prior art method is composed of a plurality of heat generation elements disposed in parallel with each other to form a full width array. This configuration can be manufactured more easily than the other basic prior art magnetic recording heads.

FIG. 1 shows an example of a prior art process for forming latent magnetic images by a recording head utilizing a heat generation body. In this figure, a magnetic recording medium 11 having a relatively low magnetic curie point is in a belt-like shape and is supported on a base layer 12. Current signals in accordance with the video image information are applied to a heat generation element array 13 having a heat generation portion 14 in contact with the recording medium 11. The temperature of the recording medium 11 rises above the curie point when heated by the heat generation array portion 14. A.c current is applied to coils 16 and an a.c. magnetic field is produced in the gap 17 of a magnetic head core 15. A latent magnetic image occurs in the heated part of the magnetic recording medium and the a.c. magnetic field remains in the recording medium after cooling in the form of a magnetization pattern in the magnetic recording medium. The magnetic recording can be made, for example, of $CrO_2$ as one of the main components. $CrO_2$ has a curie point near 130° C. which is a temperature readily obtainable by the heating of the prior art heat generation element array. However, plastic materials, when used as the base layer for the $CrO_2$ medium, usually exhibit thermal deformation, even with temperatures as low as those in the vicinity of the $CrO_2$ curie point. This deformation causes distortion of images developed by magnetic toners especially for subsequent images on the medium. Further, since $CrO_2$ is usually used as a coating form prepared by being dispersed in a binder, it has insufficient magnetization density and provides insufficient developing performance.

It is an object of this invention to provide a magnetic recording head for use in magnetography capable of eliminating the foregoing drawbacks in the prior art, and forming magnetic latent images at a high speed.

It is another object of this invention to provide a magnetic recording head capable of forming excellent magnetic latent images without causing thermal deformation in the base layer for the magnetic recording medium.

It is a further object of this invention to provide a magnetic recording head capable of forming magnetic latent images on many different magnetic recording media rather than being limited to a specific recording medium.

These and other objects will become apparent from the following specifcation when taken in conjunction with the accompanying drawings wherein.

According to this invention, a magnetic recording head suited to magnetography can be obtained, by disposing a high magnetic permeable body of a relatively low magnetic curie point in the gap of an elongate track magnetic recording head having the same length as the width of an original and disposing, adjacent to the high magnetic permeable body, a heat generation means capable of being selectively heated in portions corresponding to the width of a picture element.

As will be explained below, the basic structure of the magnetic recording head according to this invention comprises an elongate thin film magnetic head core portion disposed substantially perpendicular to the moving direction of the magnetic recording medium, a heat generation member of the same length as that of the thin film magnetic head core portion is in the gap of the magnetic head core portion. A wiring layer is provided for the application of selective voltage to a part of the heat generation member and a high magnetic permeable body of a relatively low magnetic critical point is disposed to a part of the gap that is in contact with the recording medium and adjacent the heat generation member. The thin film magnetic head core portion is excited by a thin film conductor therefor.

While the high magnetic permeable body to be used in this invention can be made, for instance, of Ni-Zn ferrite (curie point 150° C.) and $Ni_{0.79}Fe_6$ alloy (curie point about 250° LC.), all of other magnetic high permeable materials can, of course, be employed so long as they can be heated with ease and are stable at room temperature.

Figure 1:
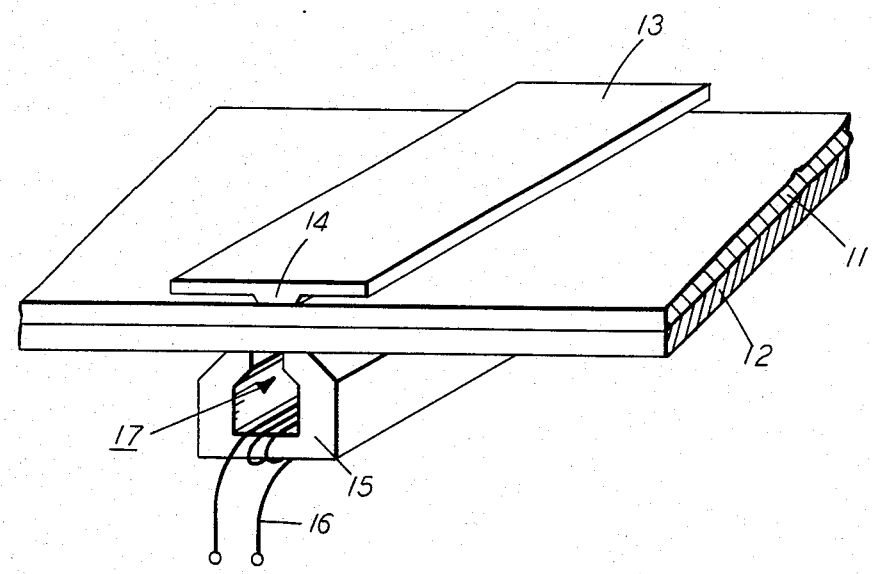
FIG. 1 is a perspective view of a conventional magnetic recording head.
Figure 2:
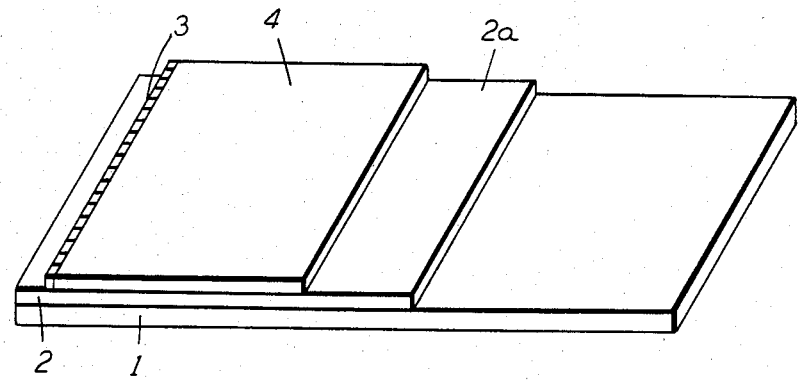
FIG. 2 is a perspective view of a partial assembly of one embodiment of the present invention.
Figure 3:
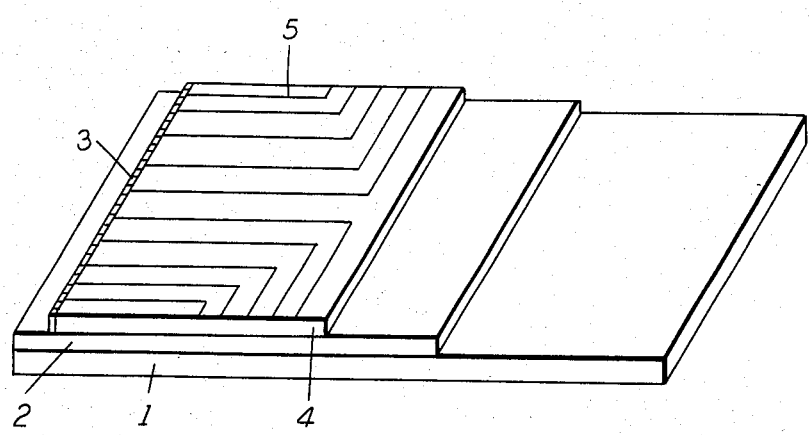
FIG. 3 is a perspective view of a partial assembly of the present invention showing the next fabrication step beyond that of FIG. 2.
Figure 4:
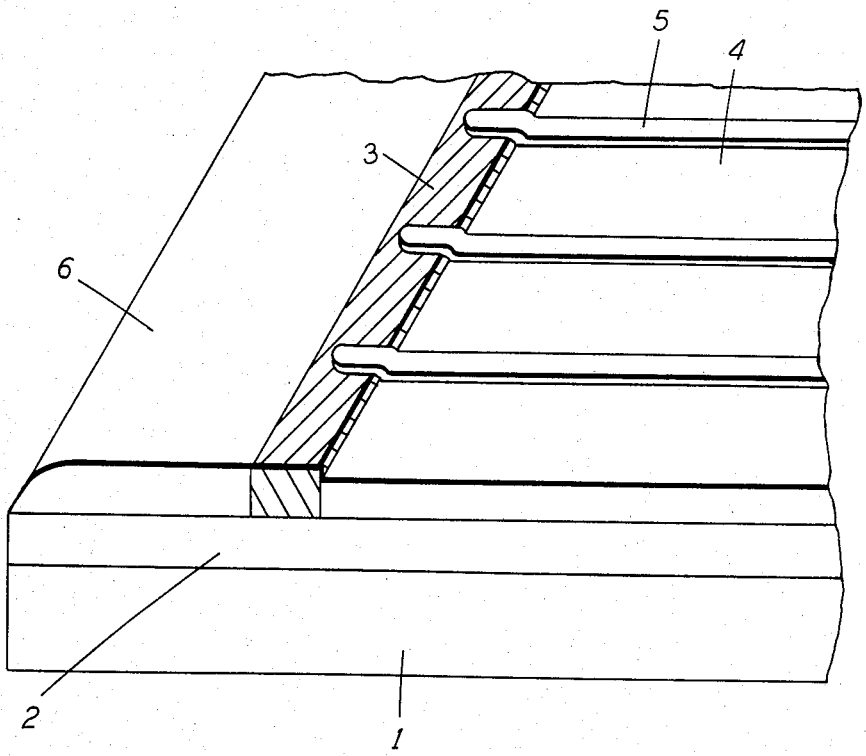
FIG. 4 is an enlarged portion of FIG. 3 and showing an additional fabrication step.

One embodiment of this invention may be explained by referring to FIGS. 2-6. In FIG. 2, to portion of a substrate 1, which is made of a ceramic material, is formed a film of a lower soft magnetic body 2 by way of, for example, sputtering. Then, a linear heat generation body 3 such as made of tantalum oxide ($Ta_2O_5$) is formed on the lower soft magnetic body 2 near the edge thereof. An insulation material 4, such as $SiO_2$, is formed as a plane at a position in adjacent to the heat generation body 3 and on a portion of the lower soft magnetic body 2. All of the above steps are carried out by well-known thin film forming processes such as sputtering or vapor deposition. Next, as shown in FIG. 3, screen printing and baking steps are applied, whereby a conductive paste, such as gold paste, is printed and baked to form a conductor wiring 5 in a layer on insulation material 4. The wiring 5 is configured to permit the application of a print signal voltage selectively to pairs of wiring 5 in order to heat portions of the heat generation body 3. The wiring terminates at the edge of the insulation material to enable connection to the print signal voltage by known means (not shown). A magnetic layer 6 is formed at the position adjacent the heat generation body 3 as shown in FIG. 4. The magnetic layer 6 is made of high magnetic permeable material of relatively low magnetic curie point. Ni-Zn ferrite material is an example of such a material and is printed and baked together with glass material in this embodiment, but it can, of course, be substituted with sputtering of Ni-Fe alloy or the like.

FIG. 4 is an enlarged perspective of FIG. 3 with magnetic layer 6 added in which the conductor wiring 5 is shown printed in such a manner that it is in good electrical contact with the upper surface of the heat generation body 3.

Figure 5:
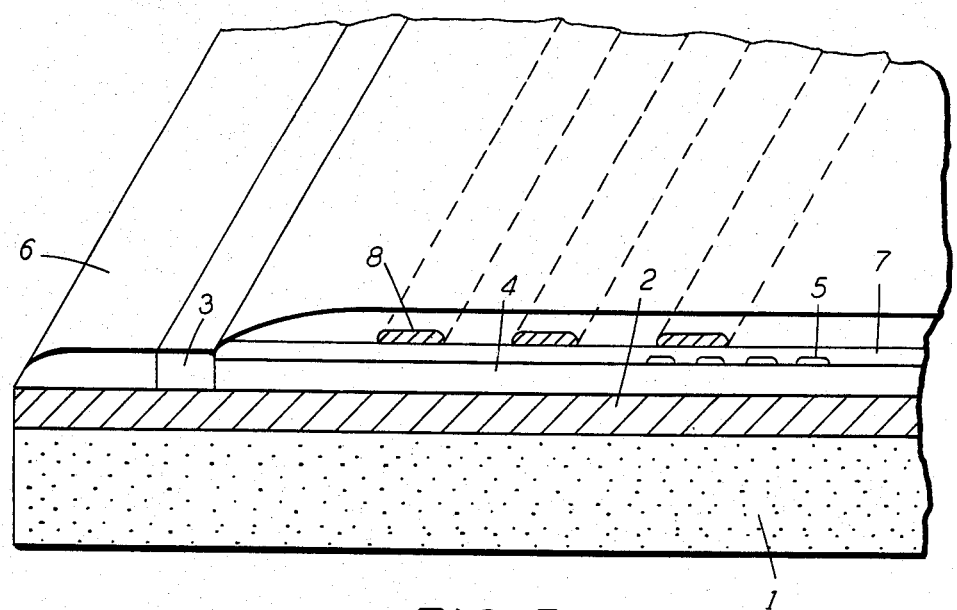
FIG. 5 is an enlarged portion similar to FIG. 4, but showing further fabrication steps.
Figure 6:
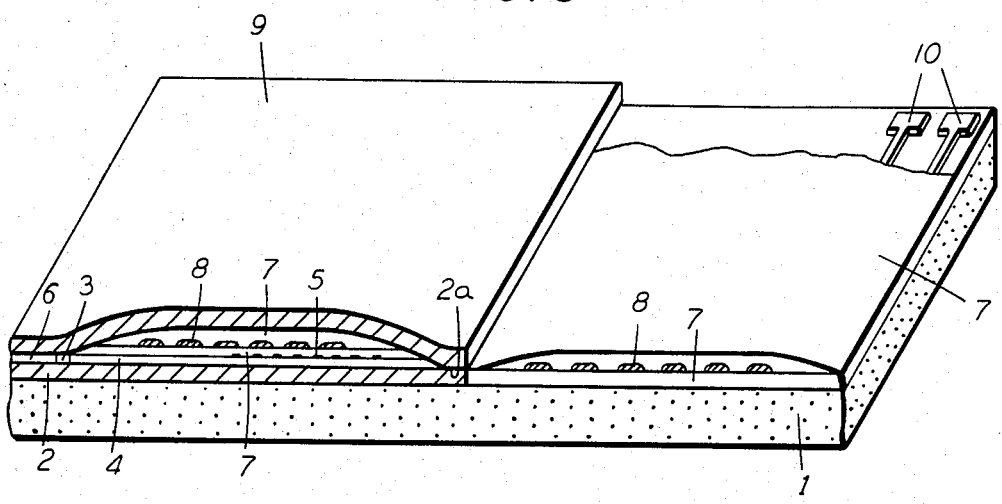
FIG. 6 is a perspective view of a substantially complete assembly of the present invention.

Then, a polyimide resin 7 is coated and dried on the upper surface of the conductor wiring 5 as an electric insulation material as shown in FIG. 5. The polyimide resin 7 is also coated and dried on the region of the substrate 1 that is not covered with the lower soft magnetic body 2 as shown in FIG. 6. An exciting coil 8 is formed on the polyimide resin 7. While the lower soft magnetic body 2 is formed only over the recording width, both of the polyimide resin layer 7 are formed exceeding the soft magnetic body 2 as shown in FIG. 6 and the coil 8 is formed on the polyimide layer. Although a returning coil is printed on the insulation layer for winding the coil in the same direction in order to lead out the coil to an electrode portion 10, the returning coil is not shown here. The exciting coil 8 can be formed by aluminum vapor-depositing while using a mask. The difference in the thickness between the polyimide resin 7 and the lower soft magnetic body 2 has to be taken into consideration, because if an abrupt change in height is present, the existing coil layer 8 may possibly be disconnected.

Figure 6A:
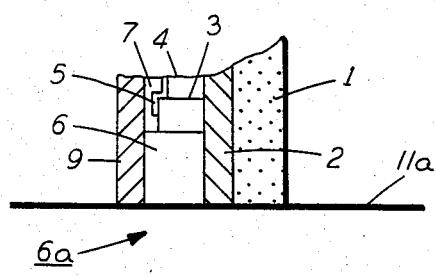
FIG. 6A is a portion of a cross-sectional elevation view of the present invention.

In FIG. 6, a film of an upper soft magnetic body 9, such as a Permalloy film, is shown formed, for example, by sputtering over the magnetic layer 6 and the heat generation body 3, as well as the entire exposed surface of the polyimide resin 7 covering exciting coil 8 and the exposed portion 2a of lower soft magnetic body 2 (refer also to FIG. 2). The lower and the upper soft magnetic bodies are connected to each other to form a generally U-shaped structure. Then, a protection film (not shown) is formed over the entire surface except for the electrode portion 10 for the exciting coil layer 8 and the connection portion of the conductor wiring 5 with an external circuit (not shown). Finally, a gap 6a in the magnetic head portion is formed between the lower and upper magnetic bodies 2 and 9 by cutting and grinding while leaving a relatively thin portion of the magnetic layer 6 as shown in FIG. 6a, thus completing the thin film magnetic recording head.

In the magnetic recording head according to this invention, the magnetic layer 6 is rendered non-magnetic in the region that is heated by the heated portions of linear heat generation body 3 which in turn has been selectively heated by the application of a print signal voltage to appropriately selected sets of the conductor wiring 5. Magnetic fluxes are produced in the lower and upper magnetic bodies 2 and 9 (hatched area shown in FIG. 6) by applying current to the exciting coil 8. The magnetic fluxes leak out into the gap, become externally widened into the magnetic recording medium 11a and are recorded therein whenever portions of magnetic layer 6 are rendered non-magnetic.

On the contrary, in a non-heated region, since the lower soft magnetic material 2 and the upper soft magnetic material 9 are magnetically coupled to form a completely closed magnetic circuit, the magnetic fluxes do not leak externally and thus produce no magnetization in the magnetic recording medium. Magnetic latent images can thus be formed by the above operations on the magnetic recording medium.

Figure 7:
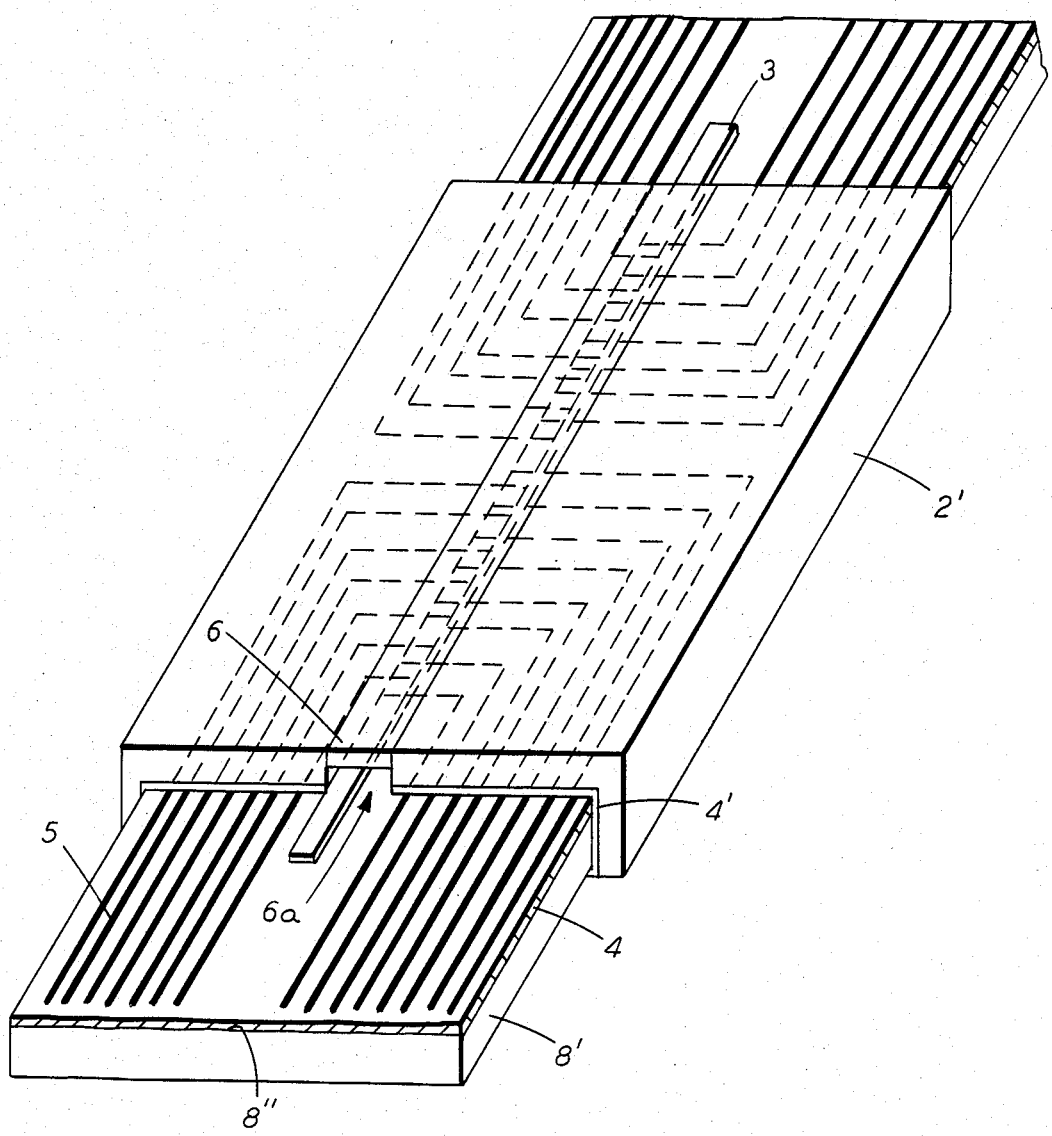
FIG. 7 is a perspective view of another embodiment of the present invention.
Figure 8:
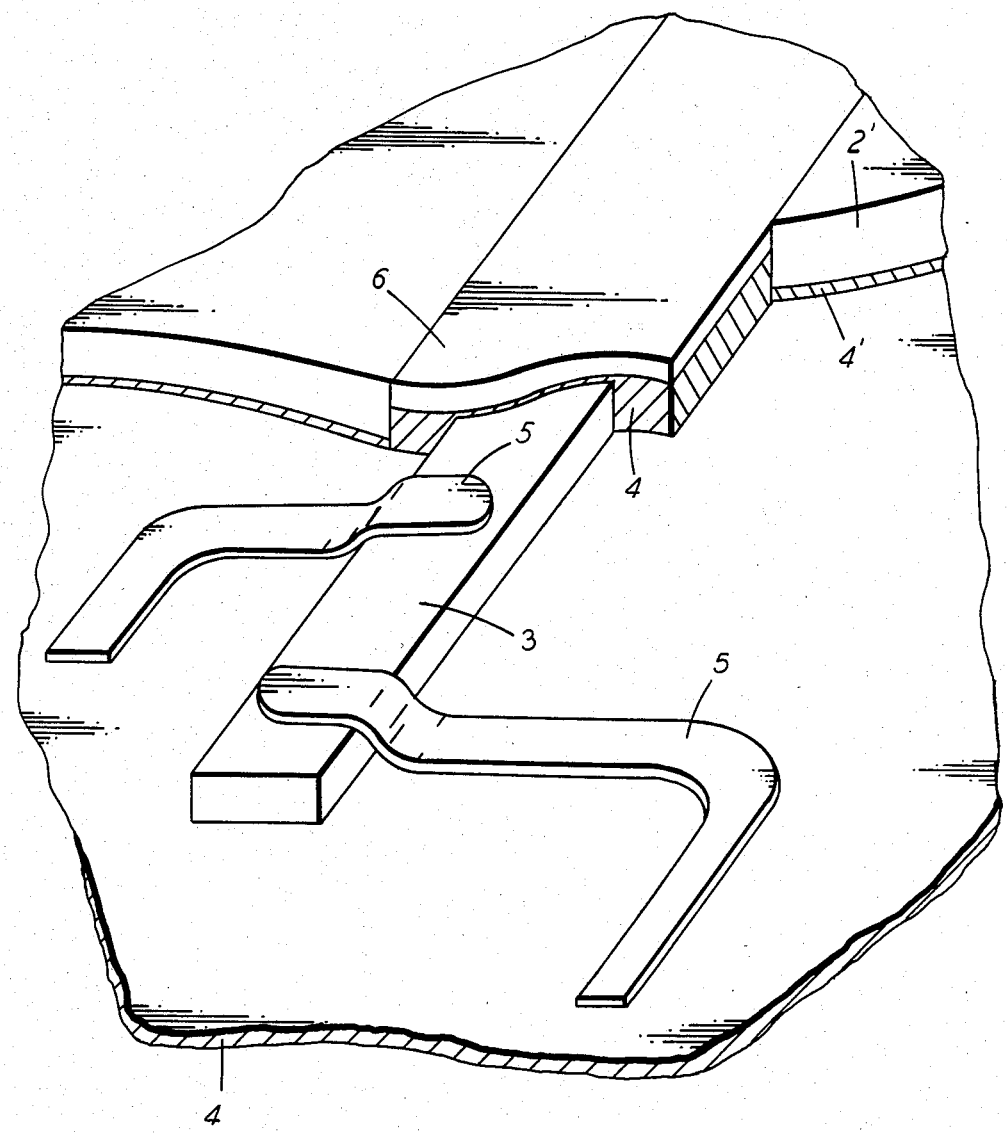
FIG. 8 is an enlarged portion of FIG. 7 with portions removed to show fabrication details.

FIG. 7 and FIG. 8 show another embodiment of this invention, wherein an exciting conductor 8', through which an exciting current passes, is surrounded by way of an insulation film 4' ($SiO_2$) which is surrounded by Permalloy core 2'. A layer of conductor wire 5 is placed on an insulation layer 4 which covers a surface 8'' of conductor 8'. Conductor wires 5 are connected to a heat generation body 3, which is disposed in a gap 6a in the Permalloy core 2', for heating segments thereof. A magnetic layer 6 is dispersed in the gap 6a covering the heat generation body 3. FIG. 8 shows the gap in an enlarged scale. When a voltage is applied to a set of properly selected conductor wires 5 to heat selected segments, the wires selected being in accordance with the video image signals, the magnetic layer 6 being made of high magnetic permeable material of relatively lower magnetic curie point exhibits a non-magnetic property in those regions heated via the heated segments of heat generation body 3. In this case, magnetic fluxes induced in the Permalloy core 2' by a.c. current passing through the exciting conductor 8' flow externally of the magnetic layer 6 rather than through it. Magnetic latent images in accordance with the video image signals can be obtained when the magnetic recording medium (not shown) passes over this portion.

It will be apparent that the magnetic recording head of this embodiment can also be manufactured by the same steps as those in the first embodiment, that is, by using, for example, thin-film forming process, print and baking process or photolithography.

The magnetic recording head of this invention can also be adapted to selectively apply d.c. current to high magnetic permeable bodies arranged in the direction of a track in accordance with the video image information, so as to heat them to a temperature above the magnetic curie point by the heat generation of the high magnetic permeable bodies themselves. In this case, the heat generation body and the conductor wire layer can, of course, be saved. Preferred high magnetic permeable body used herein includes, for example, single crystal ferrite having such an ohmic resistivity as enabling it for the heat generation body, e.g., of about 0.2 ohm-cm. Desired material for the magnetic head core includes, for example, those ferrite materials produced by hot hydrostatic press having a high ohmic resistivity.

According to the magnetic recording head of this invention, a magnetic recording head for magnetography is capable of forming magnetic latent images at a remarkably high speed much higher than can be usually obtained. Also, magnetic recording medium is not heated, no thermal deformation occurs in the base layer. Further, an excellent advantage can also be obtained in that magnetic latent images can be formed on all sorts of magnetic recording medium; and recording head can be used as a magnetographic device with great developing performance. Furthermore, the magnetization pattern is formed only to the part of the magnetic recording medium that is selectively magetized by external magnetic flux flow produced when the high magnetic permeable body is heated to its curie point, thus, rendering it non-magnetic and interrupting the flow of the magnetic flux in the recording head. A so-called positive pattern can be obtained by developing the magnetization pattern and this provides an additional advantage in that the energy consumed for the image formation can be decreased significantly when printing originals containing large white background portions, as is the usual case for most documents.

While the invention has been described with reference to the structure and fabrication steps disclosed, it is not confined to the details set fort but is intended to cover such modifications or changes as may come within the scope and spirit of the following claims.

We claim:

1. A magnetic recording head for producing latent magnetic images in a moving magnetic recording medium comprising:
    an elongated, thin film magnetic head core having a gap therein, the magnetic head core being disposed substantially perpendicular to the moving direction of the magnetic recording medium and in contact therewith so that the gap is adjacent the magnetic recording medium;
    a thin film electrical conductor coiled about said magnetic head core for exciting the magnetic head core to produce a magnetic flux therein;
    a heat generation body disposed in said gap of said magnetic head core and having the same length as said magnetic head core;
    a wiring layer positioned within said magnetic head core, the layer having a series of electrically conducting wires connected to said heat generation body and adapted for selectively applying a print signal voltage to a segment of the heat generation body between any two wires connected thereto; and
    a high magnetic permeable body having a relatively low magnetic curie point and disposed within the gap of the magnetic head core and in contact with the heat generation body and the moving recording medium.

2. The magnetic recording head of claim 1, wherein the high permeable body is a magnetic material having a curie point within a range of 120°–250° C.

3. A magnetic recording head for producing latent magnetic images in a moving magnetic recording medium comprising:
    a magnetic head core mounted on a structural substrate and comprising upper and a of lower magnetic layers, one edge of each layer being joined and the opposite edges forming a gap, the edges which form the gap being in contact with the moving magnetic recording medium, the magnetic head core being disposed substantially perpendicular to the moving direction of the moving magnetic recording medium;
    a high magnetic permeable body having a relatively low magnetic curie point being positioned in the gap of the head and in contact with both layers of the head core, the high magnetic permeable body filling said gap and being in contact with the moving magnetic recording medium;
    a heat generating body being positioned in the gap of the magnetic head core and in contact with the high magnetic permeable body and located on a side thereof that is opposite to the one contacting the moving magnetic recording medium;
    means for heating segments of the heat generating body, said means for heating being disposed within the two layers of the magnetic head core and electrically insulated therefrom;
    strips of electrically conductive material coiled on a generally planar surface, a portion the coiled strips being positioned between the two layers of the magnetic head core for producing a magnetic flux within the magnetic head core, the strips of conductive material being electrically insulated from both the means for heating segments of the heat generating body and the layers of the magnetic head core;
    means for providing voltage to said strips of electrically conductive material to produce a magnetic flux in said magnetic head core; and
    means for selectively applying a print signal voltage to said means for heating segments of said heat generating body for heating selected segments thereof which in turn heats portions of the highly magnetic permeable body above its curie point thereby rendering that heated portion of the highly magnetic permeable body non-magnetic so that the magnetic flux moves external thereof and into the moving magnetic medium.

4. The magnetic recording head of claim 3, wherein:
    the width of said magnetic head core and gap therein extends the full width of the moving magnetic medium and an original document to be produced;
    the high magnetic permeable body is a magnetic material having a curie point within a range of 120°–250° C.; and
    the heat generating body is made of tantalum oxide ($Ta_2O_5$).

* * * * *